Aug. 4, 1964

C. H. WADLEIGH 3,143,633

ARC BURN BACK PREVENTIVE SYSTEMS

Filed Dec. 22, 1960

INVENTOR.
CLIFFORD H. WADLEIGH

BY

*Leslie C. Byer*

ATTORNEY

Aug. 4, 1964
C. H. WADLEIGH
3,143,633
ARC BURN BACK PREVENTIVE SYSTEMS
Filed Dec. 22, 1960
2 Sheets-Sheet 2
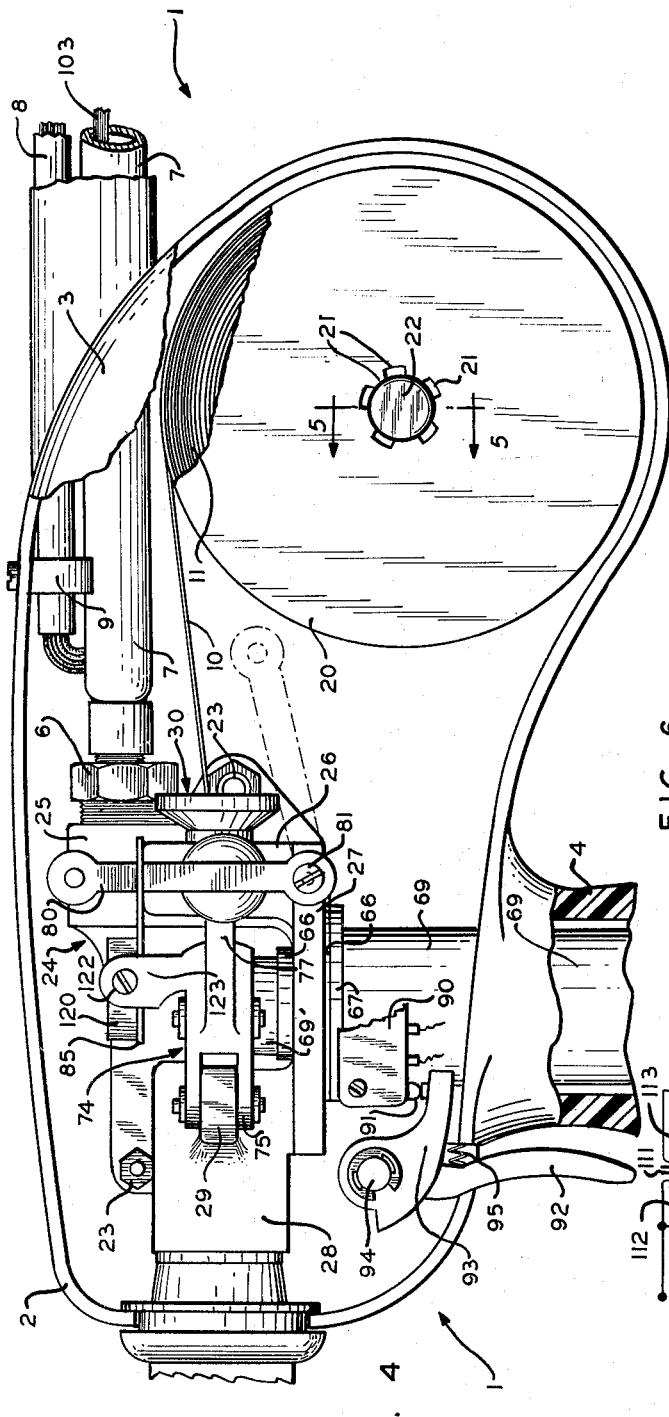
INVENTOR.
CLIFFORD H. WADLEIGH
BY
*Leslie C. Byer*
ATTORNEY

United States Patent Office 3,143,633
Patented Aug. 4, 1964

3,143,633
ARC BURN BACK PREVENTIVE SYSTEMS
Clifford H. Wadleigh, North Bergen, N.J., assignor to Air Reduction Company, Incorporated, New York, N.Y., a corporation of New York
Filed Dec. 22, 1960, Ser. No. 77,534
2 Claims. (Cl. 219—130)

This invention relates to arc burn-back preventive systems for use in arc-welding apparatus of the type out of which an elongated electrode is automatically fed to be projected onto a work electrode by and in an arc between the electrodes. Such apparatus may for example be of the general type shown in U.S. Patent No. 2,504,868 issued, an application of Albert Muller et al., to the assignee of the present invention. While it will be described with particular reference to an elongated electrode of wire form, it will be understood that no unnecessary limitation to that form is intended.

In setting up such apparatus for use there is of course normally provided a relatively lengthy supply of the elongated electrode—such, for example, as a supply of wire electrode in reeled-up arrangement. The apparatus is commonly arranged to draw the electrode off from this supply and to feed it out of the apparatus by means of a suitable electrode-driving assembly located between that supply and an exit orifice. In the proper functioning of such apparatus the electrode, progressively emerging through the orifice, will extend outwardly in its wire or other elongated form to a region spaced (in the direction of wire travel) a little way beyond the orifice; at this region it forms one extremity of the welding arc—the arc converting the emerging electrode into molten form (typically though not limitatively, into minutely subdivided molten droplets) and transporting it in that form to the work electrode or other extremity of the arc. Through techniques which are already understood the normal operation is caused to be a dynamically balanced one—i.e., the conversion of the electrode into molten form normally takes place at the same lineal rate as that at which the electrode is being fed, so that the spacing of the region mentioned above beyond the orifice normally stays essentially constant.

Among the techniques ordinarily used with apparatus of this kind is an arrangement of the apparatus so that the supply of electrical energy to the arc is cut off, and the arc thus extinguished, simultaneously with any de-energization of the electrode-driving means. This arrangement is of importance because if, while the arc is in progress, the electrode were to stop feeding out of the orifice and to become stationary, the extremity of the arc would move along—i.e., would burn back along and would consume—the now-stationary electrode to the member in which the orifice is provided; the burn-back action would, unfortunately, not stop with the arrival of the arc extremity at that point, but would continue to include an immediately ensuing transfer of the arc extremity to that member. This would result in serious damage to or consumption of that member and, if the supply of energy to the arc has still not been cut off, by a further transfer of the arc to, and consequent destructive effect on, some still further portion of the apparatus. The arrangement of the apparatus described above obviously prevents such burn-backs under normal conditions.

Even though this arrangement be employed, however, there remains a circumstance under which the destructive burn-back may still occur. This circumstance is the exhaustion of the supply of the elongated electrode—i.e., the passage through the electrode-driving means of the last lineal section of the supply (e.g., if the supply be in the form of a reel the inner end of the reel)—while the driving means is still energized. At the moment of the exhaustion that energization, although continuing, becomes ineffective to feed the electrode, and as of that moment a terminal length of the electrode extending from the driving means is suddenly left stationary. The fact that the energization of the driving means is still taking place of course leaves uninvoked the arc-extinguishing action of the arrangement described above. The result—unless foreclosed by exceptional and altogether unexpectable adroitness on the part of the operator of the apparatus—is an almost instantaneous burn-back of the arc, just as though the electrode-driving means had been de-energized without extinguishing the arc, and with identical destructive effects.

To avoid the destructive burn-back under this circumstance it has ordinarily been necessary for the operator to make inspections from time to time of the supply of the electrode in his apparatus, and finally deliberately to discard some remnant which he considers too small to rely on as sufficient for his next "round" of welding. Alternatively it has been proposed to place a sensing device in the region between the electrode supply and the driving means, normally biased against the travelling electrode and acting, in response to its disappearance from this region, to extinguish the arc. Such an arrangement, however, requires many added parts; is quite critical to adjust, because the electrode in this region can be and usually is free to move substantially in different planes; and moreover is objectionable in use because it presents separate and additional mechanism to be manipulated—and very possibly misadjusted—in loading or threading a new supply of the electrode in the apparatus.

It is an object of the present invention to provide simplified automatic means for preventing destructive burn-back upon exhaustion of the supply of the elongated electrode. It is an object to provide automatic means which impose no additional load on the electrode-driving means, for preventing such burn-back. It is an object to provide non-critical automatic means for preventing such burn-back. It is an object to provide automatic means for preventing such burn-back which involve no additional mechanism to be manipulated in loading a new supply of the electrode in the apparatus.

It is a general object of the invention to prevent destructive burn-back, upon exhaustion of the supply of the elongated electrode, in an improved manner.

Other and allied objects will appear from the following description and the appended claims.

According to the invention, as hereinafter more fully set forth, I prevent destructive burn-back upon exhaustion of the supply of the elongated electrode by suitably associating an electrical switch with a portion of the means which is already present for driving the electrode, in such a manner that the switch will be automatically thrown upon the disappearance of the electrode as sensed by that driving means itself, and utilizing the throw of this switch to extinguish the arc.

In the description of my invention hereinafter set forth reference is had to the accompanying drawing, in which:

FIGURE 1 is a parital top view of a welding gun, appropriate to an elongated electrode of wire form, in which the switch contemplated by my invention has been incorporated, parts of the exterior of the gun having been broken away to show various portions therebelow in section or in plan, and the wire-driving means being placed in wire-driving condition but the latch for maintaining that means in that condition not yet being engaged and the latch arm being omitted from this figure for simplicity;

FIGURE 4 is a parital elevational view of the welding gun of FIGURE 1, with its lefthand side cover removed and with the latch for the wire-driving means in engaged position;

FIGURE 5 is a fractional cross-sectional view taken along the line 5—5 of FIGURE 4; and FIGURE 6 is a schematic wiring diagram of the arc-welding apparatus of which the gun forms a part, showing a preferred method of electrical interconnection of the elements according to the invention.

Figure 1:
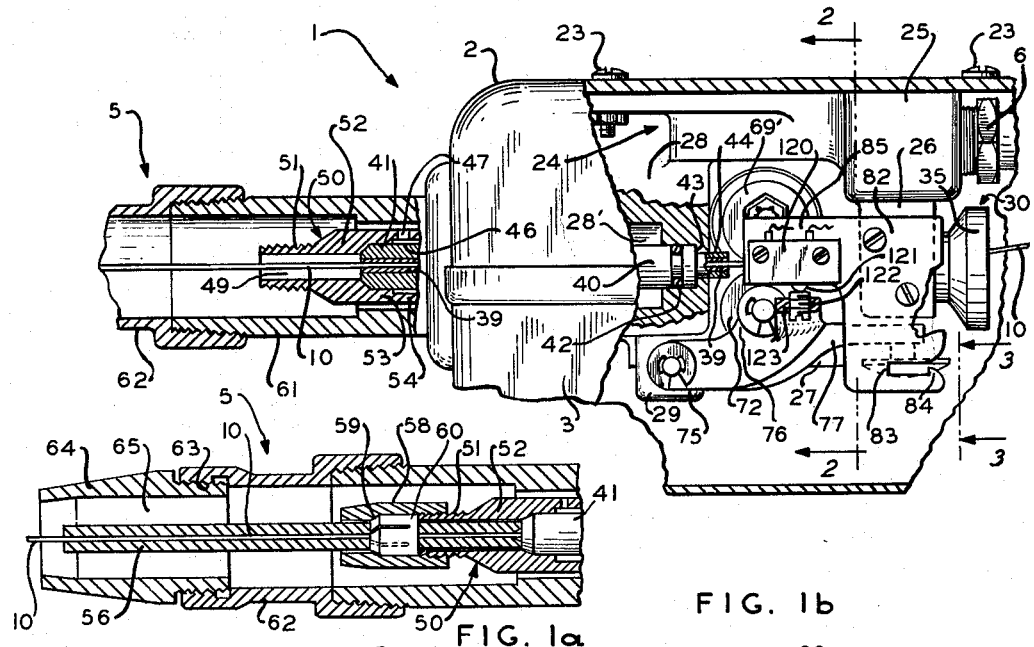
FIGURE 1a is a fractional horizontal sectional view illustrating the most forward portion of the gun (and forming an overlapping forward continuation of the showing of FIGURE 1)
FIGURE 1b is a fractional horizontal sectional view of part of the same structure taken along the wire-feeding path.

The general organization of the gun 1 may be seen in FIGURES 1 and 4. Externally the gun comprises a righthand casing 2; a lefthand casing or cover 3, which is removable from the casing 2 (and is so shown in FIGURE 4), a handle 4 (seen, only fractionally, in FIGURE 4) extending downwardly from the casing 2; and an outlet portion (seen in FIGURE 1) designated generally as 5. The righthand casing 2 serves as a base to which most of the parts of the gun are assembled.

The wire electrode which is to be fed out of the gun and is to be projected onto the work electrode in an arc between the electrodes is designated as 10. A supply of this electrode is conveniently provided within the gun in the form of a reel 11; this may be carried on a removable circular spool 20, the lefthand side of which appears in FIGURE 4 and a fractional cross-section of which appears in FIGURE 5. As best understood from the latter figure, the insertion of the spool into the gun may be effected by slipping it over a spindle 12 which is journalled on a post 15 secured to and extending horizontally inwardly from the casing 2 in the rear portion of the gun, and clamping the spool to the spindle by means of a knurled-head screw 22.

The spindle 12 may be retained in its position on post 15 by means of an axial screw 17, immediately under the head of which is a washer 18; between this washer and a suitable internal shoulder 13 on the spindle there may be compressed a helical spring 19. The function of this spring is to regulatedly bias an inner end portion 14 of the spindle against a flange 16 formed on the post immediately adjacent the casing 2, thereby providing a constant braking force on the spindle; this braking force is rendered positively effective on the spool—in order to prevent overrunning of the latter upon stoppages of the wire feed—by a keying of the spool to the spindle through suitable reciprocal castellations of each designated as 21 and best seen in FIGURE 4.

Figure 1B:
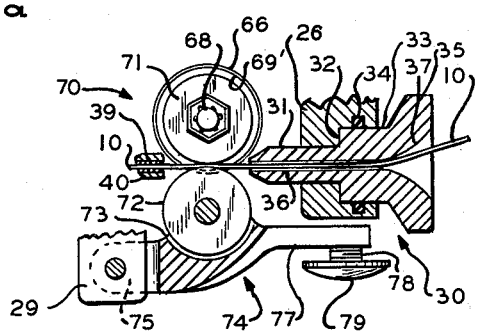

From the reel 11 the wire electrode 10 passes forwardly within the gun to a wire-inlet guide bushing 30, the rear of which is seen in each of FIGURES 1 and 4 but which is seen in its entirety in the cross-sectional FIGURE 1b. Before further discussing this bushing it will be convenient first to describe briefly the portion of the gun in which it is mounted.

This portion is a casting 24 extending inwardly from the casing 2 and secured thereto as by screws 23—the front-and-back extent of the casting being roughly from the rear one to somewhat forwardly of the forward one of those two screws. Near its rear, adjacent the casing 2, the casting 24 has an upwardly and inwardly enlarged portion 25 (into the upper portion of which from the rear may enter the terminal coupling 6 of a gas-carrying hose 7 hereinafter briefly mentioned). From the casting portion 25 another portion 26 extends further inwardly to traverse the cross-sectional central area of the gun. It is through this casting portion 26, in that central area, that the bushing 30 is placed, with its axis disposed in a front-and-back direction.

Underneath the casting portion 26 the casting 24 comprises a "shelf" portion 27, which extends leftwardly beyond and for a considerable distance forwardly from portion 26 (as best seen in FIGURE 4). Above and forwardly overhanging the shelf portion 27, and spaced a substantial distance forwardly from the portion 26, is an enlarged casting portion 28 roughly centered about the axis of the inlet guide bushing 30. Further wire-guiding elements, as well as the entire outlet portion 5 of the gun, are assembled in and to this portion 28, in co-axial relationship with bushing 30, as later herein described.

Reverting to the bushing 30, this will be seen from FIGURE 1b to comprise a forward portion 31 of reduced diameter and having a tapered forward extremity; an enlarged central portion 33 separated from 31 by a shoulder 32; and an outwardly flared rear portion 35. The casting portion 26 is suitably apertured to receive the bushing 30, which may be simply pushed therethrough from the rear until the shoulder 32 abuts against a corresponding shoulder in the aperturing of 26, whereupon the bushing will extend both forwardly and rearwardly from 26; the bushing may be retained in that position by the action of a suitable O ring 34 inset into the periphery of the central portion 33. The bushing is provided with an axial bore 36 of a diameter slightly larger than that of the wire electrode (the simple insertibility and removability of the bushing facilitating interchange of bushings to accommodate various wire-electrode diameters). Toward the rear of the bushing this bore may be flared outwardly, as indicated at 37, to accommodate the approach of the wire electrode 10 thereto from the reel 11 in directions differing, both vertically and horizontally, according to the precise location on the reel 11 of the then-outer turn of the wire electrode.

Spaced a distance forwardly from the forward extremity of the bushing 30, as best seen in FIGURES 1 and 1a read together, is the rear extremity of a relatively long wire-outlet guide tube 40—of which the forward portion 41 extends (as seen in FIGURE 1) for a substantial distance forwardly beyond the casing 2. In its rear region this outlet guide tube 40 may be provided with a short reduced-diameter portion 44 separated from the remainder of the tube by the shoulder 43. The tube may be inserted rearwardly through an oversize bore 28' extending from the front through the principal part of the front-and-back extent of the casting portion 28, and through a fitting aperture in the remainder of that casting portion, until the shoulder 43 abuts against a corresponding shoulder in that aperture. Thereupon the rear portion 44 of the tube will extend for a short distance rearwardly from the portion 28; the tube may be tentatively retained (and gaseously sealed) in that position by the action of a suitable O ring 42 inset into the periphery of the tube near the shoulder 43. The tube 40 may be provided with a bore somewhat larger than the largest diameter of wire electrode to be accommodated by the apparatus, and in this bore may be carried a removable lining tube 39; this tube in turn may have a bore just freely accommodating the particular wire electrode currently in use.

The tube 40 is firmly held in the position described above by a barrel 50, of which an intermediate portion 53 fittingly surrounds the forward portion of the tube—and of which a relatively long rear portion 54 extends, around and with a slight spacing from the tube, to be screwed into a suitable internally threaded bore (not shown) in the forward part of casting portion 28. Forwardly of its portion 53 the barrel 50 has the successive portions 52 and 51, which together have a bore 49 smaller than the bore of portion 53 (the internal shoulder, for example, a conical one, formed therebetween serving as the longitudinal retaining means for tube 40). The forward one 51 of these portions may be of much reduced external diameter and externally threaded, and onto it from the front may be screwed an elongated cap-nut 58; the forward portion of this nut has a bore similar to bore 49 and separated from the principal part of the nut interior by an internal conical surface 59. This conical surface serves, as the cap-nut is screwed onto the barrel portion 51, to compress a collet 60 which is placed within the cap-nut to lie immediately forward of the forward barrel extremity, and of which the forward portion has a corresponding external conical surface. The collet may have a bore (not shown) normally similar to bore 49, and may be slotted rearwardly from its forward extremity for almost its full length in order that, when it is compressed by the cap-nut, its bore will become slightly constricted.

Extending from the forward extremity of the outlet guide tube 40, within the bore 49 and through the collet 60 and forwardly from the collet for a distance hereinafter referred to, may be an outlet contact tube 56—it being to clamp this tube in that location that the collet may be slightly compressed as above described. This contact tube may be provided with a bore just freely fitting the wire electrode.

The forward portions of tube 40 and of barrel 50, and of course the cap-nut 58 and collet 60, are all comprised within the outlet portion 5 of the gun, initially referred to. The description of that portion may be briefly completed as follows:

About the barrel 50 there is provided a cylindrical casing 61, which at its rear extremity (not shown) may be internally threaded and screwed over suitable external threading (not shown) provided for this purpose on the barrel 50. Forwardly the casing 61 may for example reach to substantially the same extent as the cap-cut 58; its forward portion may be externally threaded, and onto that forward portion may be screwed a generally cylindrical fitting or adapter 62. The forward portion of this adapter may be provided with internal threading 63, into which may be screwed an externally threaded nozzle 64. The outlet contact tube described above may extend forwardly within the adapter 62 and nozzle 64 to terminate a little rearwardly of the forward extremity of the nozzle.

It may be pointed out that the bore of the contact tube, at the forward extremity of that tube, constitutes the orifice out of which the wire electrode emerges, and that under dynamic conditions of use that electrode will normally extend to a point a little forward of the forward extremity of the nozzle—at which point will be the extremity of the arc. The annular space 65 between the contact tube and wire on the one hand and the nozzle on the other is referred to below.

Figure 2:
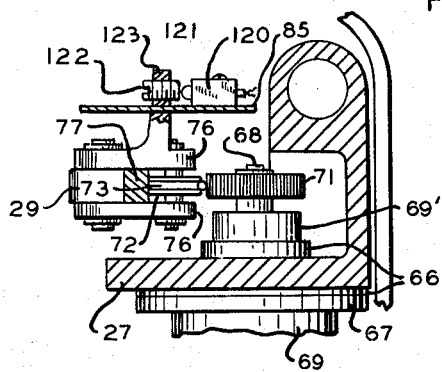
FIGURE 2 is a fractional vertical cross-sectional view taken along the line 2—2 of FIGURE 1.

The path of the wire electrode having now been described, attention may be directed to the means by which that electrode is driven along that path. This, best seen in FIGURES 1, 1b and 2 and designated generally as 70, may consist of a wire-driving assembly having portions respectively on each side of the path at the region along the path which lies between the forward extremity of the inlet guide bushing 30 and the rear extremity of the outlet guide tube 40. One portion of the wire-driving assembly, located to the right of the wire path, may comprise a driving roller or capstan 71, secured to the upper end portion of the upwardly extending shaft 68 of a suitable small electric motor 69—the motor itself conveniently having a flange 67 mounting it to the bottom of the shelf portion 27 of the casting 24, with a suitable insulating element 66 interposed between motor and shelf portion, having its main body hanging down from the flange to within the handle 4, and having an upper portion 69′ of reduced diameter extending for a distance upwardly above the flange and the shelf portion. The periphery of the driving roller lies immediately adjacent the path of the wire electrode, and is preferably knurled. It will therefore be understood that if the wire electrode in the path be suitably pressed against the periphery of the driving roller, the wire electrode will be driven by that roller when the motor is operated. It is the function of thus pressing the wire electrode against that periphery which is performed by the other portion of the driving assembly.

Accordingly the other portion of the wire-driving assembly, located to the left of the wire path, may comprise a suitably biased pressure element. Desirably the pressure element is itself a roller 72; it is at the same level as 71, supported for movement toward and away from 71, and preferably provided with a peripheral groove 73 into which a fraction only of the cross-section of the wire electrode may fit. To effect its movable support the pressure roller 72 may be carried between—desirably, journalled for free rotation about a vertical axis extending between—two projections 76 extending rightwardly from the mid-portion of a bifurcated horizontal lever 74, of which the bifurcated forward end portion 75 may be pivoted, along a vertical axis, on a lug 29′ extending leftwardly from the rear part of the enlarged forward casting portion 28. In its rear portion the lever 74 may become an integral arm 77. Adjustably screwed through this arm, along a left-to-right horizontal axis, may be a screw 78 terminating to the left in a relatively large oval head 79. It is against this head that there may be suitably applied to the lever 74 a rightward biasing force, which will cause the peripheral groove 73 of the pressure roller 72 to press the wire against the periphery of, and thus into driven relationship with, the driving roller 71.

Figure 3:
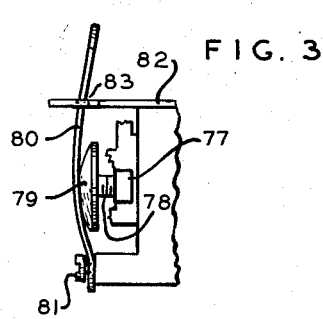
FIGURE 3 is a fractional vertical sectional view taken along the line 3—3 of FIGURE 1 and showing the latch engaged.

To apply this bias there may be employed a spring arm 80, of which the one end portion is pivoted on a horizontal shoulder screw 81 screwed into the lefthand edge of the casting shelf portion 27 below the screw-head 79. This spring arm 80, assuming it first to lie in an approximately horizontal position extending rearwardly from the shoulder screw, may be swung counter-clockwise (as viewed in FIGURE 4) about that screw into an upstanding position—an intermediate upper portion of the spring arm passing, during the last part of such swing, into a retaining slot 83 formed in a flat thin shelf 82 (best seen in FIGURE 1) secured to the top of and leftwardly overhanging the casting portion 26. During the last part of such swing a lower intermediate portion of the spring arm 80 will impinge upon the screw-head 79, and will be cammed leftwardly by the oval configuration of the latter; at the conclusion of such swing—the upper portion of the spring arm then being fully inserted into the slot 83—the lower intermediate portion of the spring arm will be centered (in a forward-and-backward direction) with respect to the screw-head and will thereby be bowed leftwardly, as indicated in FIGURE 3. It is the force developed in the spring arm by this bowing thereof which is applied against the screw-head 79 to effect the biasing described above. Dependably to retain the spring arm 80 in fully inserted position in the slot 83, the rearward portion of the slot, just behind the fully inserted position of the spring arm, may be provided with a slight constriction 84 which will lie in the path of any rearward "creeping" within the slot which the spring arm might otherwise attempt under the influence of vibration or the like.

To control the operation of the apparatus there may be mounted (through mounting means not necessary to show) in the lower lefthand forward portion of the gun an electrical switch 90; this is preferably of an encased variety throwable, against the bias of an internal "over-center" spring, by relatively light upward pressure on a limitedly movable plunger 91 projecting downwardly from the casing of the switch. This switch may be normally open, and may be closed to place the apparatus in condition for operation by rearward finger pressure on a suitable trigger 92. This trigger may have an upper portion pivoted as at 94 in the lower forward portion of the gun, and from that pivoting may extend downwardly through a suitable aperture in the casing so that its finger-engageable portion lies slightly forward of the upper part of the handle 4; the trigger may be forwardly biased as by an appropriately placed coil spring 95, and may be operatively linked with the switch through the medium of a suitable arm 93.

It may be mentioned that the rearward movement of the trigger may serve not only to close switch 90, but also to open a valve (not shown) through which an inert gas under pressure may be released to within the casing 61 to emerge from the annular space 65 in a stream surrounding the emerging wire electrode. The function of this gas stream is well known as the very useful one of excluding oxygen and other reactive components of the air from the weld area during the welding process; this is of especial importance in the welding of aluminum and its alloys, to which apparatus of the type herein dealt with is especially, though in no sense exclusively, adapted.

The path of the gas to within the casing 61 need be only generally described as through the hose 7 to within the gun and through the coupling 6 into the casing portion 25; within the casing to the valve mentioned above; and from the valve within the casing to a narrow annular space 46 surrounding the outlet guide tube 40, the forward extremity of which communicates (as seen in FIGURE 1) with the interior of the casing 61 through one or more ports 47 provided in the barrel 50.

The gun 1 may form a part of a welding apparatus of which the preferred electrical components and their interconnections are schematically shown in FIGURE 6. Herein there appear in schematic form the gun 1, including therewithin the wire electrode 10, the reel thereof 11, the outlet contact tube 56, the driving roller 71, the pressure roller 72, the motor 69, and the switch 90. An electrical source 101, ordinarily of direct current, may furnish power for the arc, being connected to the work electrode 100 through a heavy conductor 102 and to the outlet contact tube—and therethrough to the wire electrode—through the conductor 103. This source 100 may also provide power for the motor 69, through a motor circuit 104 connected between the conductors 102 and 103. This motor circuit 104 may serially include a potentiometer 106 (physically located for example at a convenient but unshown position on the gun 1) and a fixed resistance 107—the motor being connected from the movable tap 105 of the potentiometer to the outer terminal of the resistance 107 so that the voltage supplied to, and thus the rotational speed of, the motor may be controlled by adjustment of the movable tap 105.

The switch 90 may be connected in series with the coil 109 of a normally-open-contact control relay 108, and the combination may be connected across the medium-voltage secondary 113 of a step-down transformer 111 of which the primary 112 may be connected across a normal A.C. line, for example of 115 volts; closure of the switch 90 will therefore ordinarily result in energization of the control relay 108 and closure of its contacts 110. These contacts 110 may be connected in series with the coil 115 of a normally-open-contact weld-contactor relay 114, and the combination may be connected across the A.C. line; closure of the contacts 110 will therefore result in energization of the weld-contactor relay 114 and closure of its contacts 116. These contacts 116 are serially interposed in one of the two welding-circuit conductors, for example 103, electrically adjacent to the source 101. Thus closure of the switch 90 will ordinarily result in the application of a potential difference, appropriate for establishment and maintenance of the arc, between the wire and work electrodes.

The motor circuit 104, being effectively connected between the electrodes, will have applied across it the inter-electrode potential difference. It is, however, entirely undesirable that the wire electrode be fed in the absence of an actual inter-electrode arc which will consume the wire electrode. Non-operation of the motor during any period of shorting of the electrodes together—as by scratching of the end of the wire electrode 10 against the work electrode 100, ordinarily resorted to as a method of starting the arc—is automatically assured by reason of the fact that the shorting, while it takes place, reduces the inter-electrode potential difference to a value much too little to cause operation of the motor. To preclude motor operation while the unshorted potential difference exists between the electrodes without an arc being in progress, the motor circuit is arranged to be open in the absence of current flow in the conductors 102 and 103. This is readily accomplished by serially inserting into the motor circuit the normally open contacts 119 of a motor relay 117, to which the coil 118 is serially interposed in one of the welding-circuit conductors, for example 103.

Physically the heavy conductor 103 may enter the gun 1 through the hose 7, within which it may be contained as indicated in FIGURE 4; it may be terminally connected to an inside surface (not shown) of the casting portion 25 prior to the screwing into the latter of the terminal hose coupling 6—the casting 24, barrel 50 and collet 60 serving to complete the electrical connection to the outlet contact tube 56. The other electrical wires shown in FIGURES 6 to enter the gun may do so in a multiconductor cable 8, also seen in FIGURE 4 which may be anchored to the inside of the casing 2 as by clamp 9.

The use of the apparatus as thus described may be briefly reviewed as follows: In preparation for welding the primary 112 of the transformer 111 will be energized by connection to the A.C. line, and the source 101 will be placed in operation. The gun 1, with the wire electrode 10 extending slightly therefrom, will be manipulated to bring the tip of the wire electrode relatively near the work electrode 100, and the switch 90 will be closed by "squeezing" of the trigger 92 (by which the flow of gas through the nozzle will be simultaneously instituted); the switch closing will result in sequential closing of relay contacts 110 and relay contacts 116, thus completing (other than at the inter-electrode arc path proper) the welding circuit. With the apparatus in this condition the tip of the wire electrode 10 will be brought into contact— typically, a momentary "scratch" contact—against the work electrode 100, and upon the breaking of this contact the arc should strike. The flow of current through the conductor 103 and thus through the coil 118, occasioned by the inter-electrode contact and subsequent arc, will cause a closure of the contacts 119—quite prompt, since the relay 117 may have relatively light contacts and may thus be of relatively low inertia—thus applying across the motor circuit a potential which will become of substantial magnitude at the moment the arc strikes and will at that instant start the rotation of the motor and the feeding of the wire electrode. The desired welding may then be performed, the switch 90 being maintained closed as by appropriate finger pressure on the trigger 92. At the conclusion of such welding as is desired to be accomplished and without removing the gun appreciably further from the work, the switch 90 may be opened by release of the trigger 92; this will cause the sequential opening of the contacts 110 and of the contacts 116, and thus the opening of the welding circuit and the extinguishment of the arc and the cessation of rotation of the motor and of wire-electrode feed.

It will be appreciated that by the arrangement of elements in the apparatus as thus described, wire feed is quite effectively interrelated with arc maintenance—i.e., the two are strongly coerced to occur, and to stop, coincidentally. This even extends to the case wherein the arc is extinguished by removal of the gun, while the arc is in progress, to such an excessive distance from the work electrode that the arc cannot be maintained—for the resulting cessation of the welding-current flow through the motor relay coil 118 automatically results in opening of contacts 119 and thus in cessation of the wire feed. On the other hand, cessation of the wire feed can be deliberately effected by the operator only by his release of the trigger 92 to open the switch 90—and this, as has been seen, forthwith extinguishes the arc. Accordingly under normal conditions the described arrangement of the apparatus well proofs the gun against destructive burn-backs such as described early hereinabove. As there pointed out, however, the arrangement still permits such burn-back to occur when the cessation of wire feed results not from the act of the operator, but instead from exhaustion of the supply of the wire electrode—i.e., the passage through the wire-driving assembly of the last lineal section of the supply—upon which circumstance the wire-driving assembly is still in an operating, even though ineffective, state.

According to my invention I mechanically associate an electrical switch with the wire-driving assembly in such a manner that the switch is in one electrical condition when the wire electrode extends, and is operated to an opposite electrical condition upon the wire electrode ceasing to extend, through that assembly, and I suitably connect the switch so that upon such operation thereof the arc will be extinguished.

In carrying out my invention I may take advantage of the fact that the two portions of the wire-driving assembly 70, described above, tend to occupy one mutual relationship when the wire electrode 10 extends therebetween, and a different mutual relationship when it does not—more specifically, of the fact that the pressure element or roller 72, and the arm 74 by which it is carried, are biased to move toward the driving roller 71 upon disappearance of the wire electrode from between the rollers. Doing so may be made to result in a structure which is simple, imposes no added load on the wire-driving means, is altogether non-critical, and in no way complicates the task of loading a new supply of wire electrode in the gun. The mechanical aspects of such a structure may be seen in FIGURES 1, 2 and 4, to which reference is now invited.

The switch contemplated by my invention appears in these figures as 120. Like switch 90 above described, this switch 120 is desirably of an encased variety throwable, against the bias of a light internal "over-center" spring, by relatively light rightward pressure on a limitedly movable plunger 121 projecting leftwardly from the casing of the switch; unlike the switch 90, the switch 120 may be a normally closed switch. It may conveniently be secured on top of a forward extension 85 of the shelf 82 mentioned above. The member which in an immediate sense exerts the pressure on the plunger 121 to operate the switch at appropriate times may be an adjustable screw 122 threaded along a horizontal side-to-side axis through the upper portion of an arm 123 extending upwardly from a mid-portion of the lever 74, with which lever that arm may conveniently be integral.

To adjust the screw 122 for operation of the switch 120 in a proper manner the wire electrode 10 may first be removed at least from between the rollers 71 and 72, and the arm 74 may then be swung counterclockwise to bring the pressure roller 72 into actual contact with the driving roller 71, and secured in that position by swinging the spring arm 80 to its vertical position in which it is engaged in the slot 83 and applies rightward bias to the screw-head 79 and arm 74. With the apparatus in this condition the screw 122 may be adjusted rightwardly until the switch 120 is just dependably thrown from its normally closed to its open condition.

The positions occupied by the pressure roller 72 and arm 74 during the adjustment process just described, and the position of the screw 122 at the conclusion of that process, are of course more rightward than those which these parts will respectively occupy in the normal condition of the gun, when a wire electrode will of course intervene between the rollers 71 and 72—in the case of the screw 122, by at least a substantial fraction of the diameter of the wire electrode. Accordingly when the gun is in that normal condition the screw 122 will be in a somewhat less rightward position than required for throwing of the switch 120 to open condition; as a result the switch will then be closed. But forthwith upon the exhaustion of the wire electrode supply—i.e., the passage between the rollers of the last lineal section of that supply—the arm 74 and pressure roller 72 and screw 122 will be moved, by the biasing force exerted by the spring arm 80, to the position described in the preceding paragraph, and the switch will thereby be operated to open condition.

As seen in FIGURE 6, the switch 120 may be electrically connected in series with the switch 90, which latter is operated by the trigger 92. Accordingly the event of exhaustion of the wire supply, which has just been seen automatically to cause the operation of the switch 120 to open condition, will have the same effect as would be produced by the release of the trigger 92 and consequent opening of switch 90—i.e., the effect of de-energizing the relays 108 and 114 and thus of invoking the arc-circuit-breaking function, thereby not only stopping the operation of the now-ineffective wire-driving assembly but also, and more importantly, extinguishing the arc and thereby positively precluding burn-back.

The extension 85 of the shelf 82, the addition of the arm 123 to the lever 74, the provision of the adjusting screw 122 and small switch 120 and the wiring of that switch in series with the nearby switch 90 comprise all that is required to incorporate my invention. The switch 122 is unoperated throughout all actual driving of the wire electrode, and neither it nor any other aspect of the invention imposes any additional load on the wire-driving means. The adjustment of the screw 122 is altogether simple and non-critical. And once that screw has been properly adjusted both the preparation for use, and the use, of the gun 1, will be identical with those of a gun in which my invention has not been embodied; loading of the supply of the wire electrode into the gun has in no way been complicated or even altered by the incorporation of the invention.

While I have disclosed my invention in terms of a particular embodiment thereof, I intend no unncessary limitation thereby. Modifications in many respects will be suggested by my disclosure to those skilled in the art, and such modifications will not necessarily constitute departures from the spirit of the invention or from its scope, which I undertake to define in the following claims.

I claim:

1. In arc-welding apparatus of the type from which an elongated electrode is fed to be projected onto a work electrode in an arc between the electrodes, the combination of an electrode-driving assembly through which said elongated electrode normally extends to be driven thereby, said assembly comprising two portions which occupy one mutual relationship when said elongated electrode extends, and which assume a different mutual relationship when that electrode ceases to extend, through that assembly; an electrical switch mechanically connected with and operated by said electrode-driving assembly to be in one electrical condition when said portions of that assembly occupy said one mutual relationship and to be operated to an opposite electrical condition upon the assumption by said portions of said different mutual relationship; an electric circuit for the arc; means for breaking said circuit; an auxiliary electric circuit, itself manually controllable, controlling said circuit-breaking means; and means electrically connected with said switch and responsive thereto in the operation thereof from said one to said opposite condition and comprising said auxiliary circuit, for actuating said circuit-breaking means.

2. In arc-welding apparatus of the type from which an elongated electrode is fed to be projected onto a work electrode in an arc meanwhile maintained between the electrodes by power supplied thereto, the combination of an electrode-driving assembly through which said elongated electrode normally extends to be driven thereby, said assembly comprising two portions which occupy one mutual relationship when said elongated electrode extends, and which assume a different mutual relationship when that electrode ceases to extend, through that assembly; an electrical switch mechanically connected with and operated by said electrode-driving assembly to be in one electrical condition when said portions of that assembly occupy said one mutual relationship and to be operated to an opposite electrical condition upon the assumption by said portions of said different mutual relationship; means contacting said elongated electrode and disposed between said electrode-driving assembly and the region of the arc for supplying arc-maintaining power to said elongated electrode; and means, electrically connected with said switch and responsive thereto in the operation thereof from said one to said opposite electrical condition, for interrupting the supply of arc-maintaining power to one of the electrodes.

References Cited in the file of this patent

UNITED STATES PATENTS

| | | |
|---|---|---|
| 2,270,720 | Thompson | Jan. 20, 1942 |
| 2,465,210 | Dickey | Mar. 22, 1949 |
| 2,676,513 | Engstrom | Apr. 27, 1954 |
| 2,719,245 | Anderson | Sept. 27, 1955 |

FOREIGN PATENTS

| | | |
|---|---|---|
| 349,804 | Germany | Mar. 8, 1922 |